United States Patent
Wilfert et al.

[15] 3,659,476
[45] May 2, 1972

[54] SAFETY STEERING WHEEL

[72] Inventors: Karl Wilfert, Gerlingen-Waldstadt; Béla Barényi, Stuttgart-Vaihingen, both of Germany

[73] Assignee: Daimler-Benz Aktiengesellschaft, Stuttgart-Unterturkheim, Germany

[22] Filed: Oct. 2, 1970

[21] Appl. No.: 77,520

Related U.S. Application Data

[62] Division of Ser. No. 760,399, Sept. 18, 1968, Pat. No. 3,567,246.

[52] U.S. Cl..............................74/492, 74/552, 280/150 B
[51] Int. Cl...........................................................B62d 1/18
[58] Field of Search..................74/492, 493, 552; 280/150 B

[56] References Cited

UNITED STATES PATENTS 2,876,654   3/1959   Sweitzer ..................................74/493
3,537,329   11/1970  Ravenel ...................................74/492

*Primary Examiner*—Milton Kaufman
*Attorney*—Craig, Antonelli and Hill

[57] ABSTRACT

A safety steering wheel for motor vehicles, particularly for passenger motor vehicles, in which the system "steering wheel-steering wheel spokes" is constructed relatively form-rigid and is arranged at the upper end of a steering column by the interposition of a yielding intermediate structure which is constituted by an elastically yielding transmission member yielding in the direction of the steering column, and an energy-dissipating element is associated with this transmission member.

13 Claims, 6 Drawing Figures

PATENTED MAY 2 1972 3,659,476

INVENTORS
KARL WILFERT
BELA BARENYI

BY Craig, Antonelli, Stewart + Hill
ATTORNEYS

SAFETY STEERING WHEEL

The present application is a divisional of Ser. No. 760,399, filed Sept. 18, 1968, now U.S. Pat. No. 3,567,246.

The present invention relates to a safety steering wheel for motor vehicles, especially passenger motor vehicles which consists of a system "steering wheel-steering wheel spokes" constructed relatively form-rigid that is arranged on the upper end of a steering column by the interposition of a yielding intermediate member.

It is proposed in the German Pat. No. 947,048 to arrange between the head piece of the steering column and the hub of the steering wheel an easily deformable intermediate member, for example, made from sheet metal. The safety of the driver is considerably improved by this measure. However, with this known type of construction, undesired damages and injuries can occur at the steering wheel. These damages and injuries may, for example, stem from the fact that the driver, during boarding of the vehicle, supports himself at the steering wheel or, after he has boarded the vehicle, pulls up at the steering wheel, for example, in order to straighten out his clothes.

The present invention aims at creating a safety steering wheel of the aforementioned type which is able to cope better with the special loads that may occur. The present invention essentially consists in that a transmission member elastically yielding in the direction of the steering column serves as intermediate member into which is built-in an energy-dissipating part. With this type of construction, both the steering forces as well as also other occurring forces are absorbed by the elastically yielding transmission member without the possibility of the occurrence of damages or injuries at the steering wheel. With this new type of construction, the energy-dissipating part also protects the driver in an advantageous manner far-reachingly against serious injuries.

Appropriately, provision may be made that the center of gravity of the transmission member, preferably of multi-partite construction, is disposed below the steering wheel center and steering column axis. This is appropriate because, as is known, during accidents in which the driver slides forwardly on the seat, the load is greatest at these places.

In a structurally simple manner, a plastically deformable part may be provided within the transmission member. The transmission member may thereby consist of an open spring strap or spring clip formed, for example, of a curved sheet-metal piece, into which is installed a sheet-metal ring extending transversely to the spring clip or spring strap and serving as deformation member. The deformable parts may also consist of other sheet-metal parts or of conventional foamed synthetic resinous material or the like. Furthermore, provision may be made that the elastically yielding transmission member is adapted to be stopped automatically against spring-back action after a predetermined deformation path. For that purpose, a free end of the open spring strap or spring clip may be constructed as snap spring.

According to a further feature of the inventive concept, a shock absorber may be arranged on the inside of the transmission member. In some cases, instead of a fluid-type shock absorber, a preferably adjustable friction-type shock absorber of conventional construction may be used for that purpose. The transmission member may consist in a constructively simple manner of a spring ring into which a spring strap or spring clip carrying the energy-dissipating part is inserted. However, several spring rings arranged eccentrically to the steering column may also serve as transmission member.

For the purpose of achieving favorable optical termination and as large as possible an impact surface for the driver, the transmission member and the built-in part may be provided with a cover in the direction toward the driver.

Accordingly, it is an object of the present invention to provide a safety steering wheel which avoids by simple means the aforementioned shortcomings encountered in the prior art.

Another object of the present invention resides in a safety steering wheel in which undesirable damages and injuries at the steering wheel are far-reachingly precluded.

A further object of the present invention resides in a safety steering wheel which is more suitable to cope with special loads and stresses that may occur at the steering wheel even under normal use.

A still further object of the present invention resides in a safety steering wheel which further increases the protection of the driver.

Still another object of the present invention resides in a safety steering wheel which is simple in construction, reliably transmits the steering movements and effectively absorbs impacts and other loads that might otherwise lead to injuries.

These and further objects, features, and advantages of the present invention will become more obvious from the following description when taken in connection with the accompanying drawing which shows, for purposes of illustration only, several embodiments in accordance with the present invention, and wherein.

Figure 1:
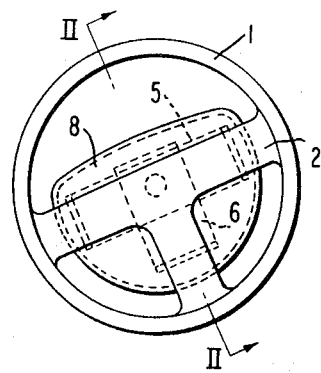
FIG. 1 is a plan view on a safety steering wheel in accordance with the present invention.
Figure 2:
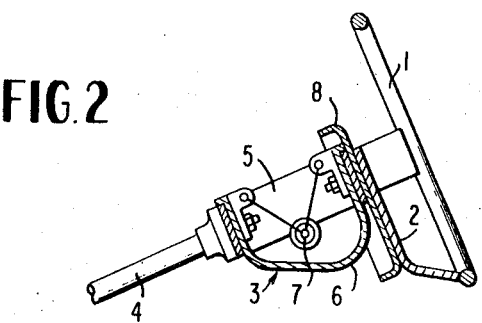
FIG. 2 is an axial cross-sectional view through the safety steering wheel according to FIG. 1 and taken along line II—II thereof.

Referring now to the drawing wherein like reference numerals are used throughout the various views to designate like parts and more particularly to FIGS. 1 and 2, the system "-steering wheel-steering wheel spokes," which is constructed relatively form-rigid by any conventional means, essentially consists of a steering wheel rim 1 and of a lower T-shaped hub base body 2 which is secured at the upper end of the steering column 4 by way of an elastically yielding transmission member generally designated by reference numeral 3. The elastic transmission member 3, which serves for the transmission of the steering forces, is formed by an elliptic spring ring 5 into which is inserted a curved spring strap or spring clip 6. The spring ring 5 and the spring strap 6 are threadably connected with the steering column 4 and with the hub base body 2. A friction-type shock absorber 7 of any conventional construction which is pivotally connected to the free ends of the spring strap 6, is arranged on the inside of the elastic transmission member 3 whose friction forces may be adjustable, for example, by way of a screw in a conventional manner and therefore not illustrated in detail herein. Additionally, an approximately semi-circularly shaped cover disk 8 is provided between the hub base body 2 and the elastic transmission member 3 which is so constructed that the field of vision of the driver is not impaired or limited thereby. Such a safety steering wheel abuts, in case of an impact of the driver, with a large surface against the body and yields in the direction of the steering column 4 whereas simultaneously the impact energy is dissipated at least in part by the built-in friction shock absorber 7. Notwithstanding this yieldingness, both the steering forces are safely transmitted as also loads which may occur, for example, by a pulling at the steering wheel during boarding or while holding fast in order to straighten out the clothes.

Figure 3:
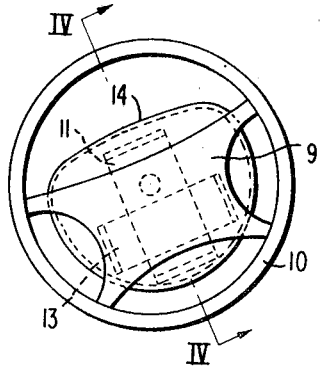
FIG. 3 is a plan view on a modified embodiment of a safety steering wheel in accordance with the present invention.
Figure 4:
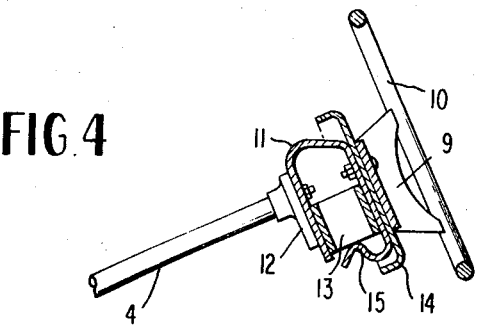
FIG. 4 is an axial cross-sectional view through the safety steering wheel according to FIG. 3 and taken along line IV—IV thereof.

The system "steering wheel-steering wheel spokes" of the embodiment according to FIG. 3 consists of a large-surface hub base body 9 which is secured at the steering wheel rim 10 in four points. The hub base body 9 is threadably secured at an elastically yielding spring strap or spring clip 11 which is threadably secured to the upper end of the steering column 4. An oval sheet metal ring 13 serving as deformation member is accommodated between the two leg portions of the spring strap 11, of which one leg portion rests on an eccentric flange 12 of the steering column 4 and the other below the hub base body 9. An approximately semi-circularly shaped cover disk 14 is arranged between the hub base body 9 and the elastic transmission part 11. The leg portion of the spring strap 11 disposed on the side of the hub base body 9 is constructed at its end as snap spring 15 which, after a deformation, snaps in about the lower leg portion and prevents a springing back of the spring strap 11. The steering forces are safely transmitted also with this safety steering wheel whereas the steering wheel is relatively rigid at the upper part of the steering wheel rim 10 against tensional loads in the direction of the steering column and yields in the direction of the steering column 4 in case of an impact of the driver. If the driver, during a collision, slides forwardly on the seat, then he hits at first against the lower part of the safety steering wheel. For this reason, the system "-steering wheel-steering wheel spokes" is constructed form-rigid in particular in its lower half and the center of gravity of the transmission member 11 together with the built-in deformation member 13 is provided also below the axis of the steering column 4 and of the steering wheel center.

Figure 5:
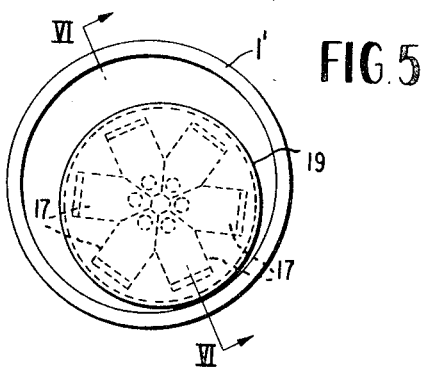
FIG. 5 is a plan view on a third embodiment of a safety steering wheel in accordance with the present invention.
Figure 6:
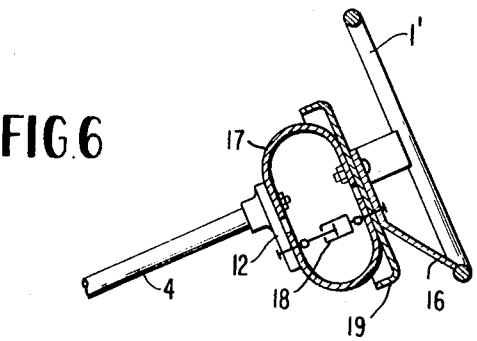
FIG. 6 is an axial cross-sectional view through the safety steering wheel according to FIG. 5 and taken along line VI—VI thereof.

In the embodiment according to FIG. 5, several eliptical spring rings 17 are provided as common transmission member between the steering wheel 1', which may be equipped with a hub base body 16 corresponding to that of the embodiment of FIG. 1, and the steering column 4. The center point of the spring rings 17 resting on an eccentric flange 12 of the steering column 4 and at the central portion of the hub base body 16 is disposed below the axis of the steering column 4 and of the steering wheel center. In order to achieve particularly favorable force conditions, the fluid-type shock absorber 18 of any conventional construction is arranged at the same distance from the center point of the transmission member 17 which the axis of the steering column 4 has from this center point. With this type of construction, a circularly shaped cover disk 19 is provided which leaves free a sufficient field of vision for the driver on the instruments of the motor vehicle.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those persons skilled in the art.

We claim:

1. A safety steering assembly for motor vehicles, especially passenger motor vehicles, which includes a relatively form-rigid system "steering wheel-steering wheel spokes," that is arranged on the upper end of a steering column by the interposition of a yielding intermediate structure, characterized by transmission means elastically yielding substantially in the direction of the steering column and serving as part of the intermediate structure, and energy-dissipating means operatively connected with said transmission means, comprising a plastically deformable part within said transmission means.

2. A safety steering assembly according to claim 1, wherein the center of gravity of said transmission means is located below the steering wheel center and below the steering column axis.

3. A safety steering assembly according to claim 2, wherein said transmission means includes open spring strap means into which is installed an annular member extending transversely to the spring strap means and serving as deformation member.

4. A safety steering assembly according to claim 3, wherein said annular member is made from sheet metal material.

5. A safety steering assembly according to claim 4, wherein the elastic transmission means is operable to be automatically stopped against spring-back movement after a predetermined deformation path.

6. A safety steering assembly according to claim 5, wherein one free end of the open spring strap means is constructed as snap spring.

7. A safety steering assembly according to claim 1, wherein said transmission means includes open spring strap means into which is installed an annular member extending transversely to the spring strap means and serving as deformation member.

8. A safety steering assembly according to claim 7, wherein said annular member is made from sheet metal material.

9. A safety steering assembly for motor vehicles, especially passenger motor vehicles, which includes a relatively form-rigid system "steering wheel-steering wheel spokes," that is arranged on the upper end of a steering column by the interposition of a yielding intermediate structure, characterized by transmission means elastically yielding substantially in the direction of the steering column and serving as part of the intermediate structure, and energy-dissipating means operatively connected with said transmission means, wherein several spring ring means arranged eccentrically to the steering column serve as said transmission means.

10. A safety steering assembly according to claim 9, wherein said energy-dissipating means is within said transmission means.

11. A safety steering assembly according to claim 10, wherein the transmission means and the means within the same are provided with cover means in the direction toward the driver.

12. A safety steering assembly for motor vehicles, especially passenger motor vehicles, which includes a relatively form-rigid system "steering wheel-steering wheel spokes," that is arranged on the upper end of a steering column by the interposition of a yielding intermediate structure, characterized by transmission means elastically yielding substantially in the direction of the steering column and serving as part of the intermediate structure, and energy-dissipating means operatively connected with said transmission means, wherein the elastic transmission means is operable to be automatically stopped against spring-back movement after a predetermined deformation path.

13. A safety steering assembly according to claim 12, wherein the elastic transmission means includes an open spring strap means having one free end, and wherein the one free end of the open spring strap means is constructed as a snap ring.

* * * * *

UNITED STATES PATENT OFFICE
CERTIFICATE OF CORRECTION

Patent No. 3,659,476           Dated      May 2, 1972

Inventor(s) Karl Wilfert and Bela Barenyi

It is certified that error appears in the above-identified patent and that said Letters Patent are hereby corrected as shown below:

Title page, insert the following:

-- Foreign Application Priority Data

Sept. 19, 1967   Germany   D 54,151 --

Signed and sealed this 28th day of November 1972.

(SEAL)
Attest:

EDWARD M. FLETCHER, JR.                ROBERT GOTTSCHALK
Attesting Officer                      Commissioner of Patents